United States Patent [19]

Lai

[11] Patent Number: 5,268,396
[45] Date of Patent: Dec. 7, 1993

[54] ORGANOSILICON SOFT DENTURE LINERS

[76] Inventor: Juey H. Lai, 3025 Carlsbad Ct., Burnsville, Minn. 55337

[21] Appl. No.: 911,555

[22] Filed: Jul. 7, 1992

Related U.S. Application Data

[63] Continuation-in-part of Ser. No. 608,212, Nov. 2, 1990, abandoned.

[51] Int. Cl.$^5$ ............................ C08F 2/46; C08J 3/28
[52] U.S. Cl. ........................ 522/28; 522/68; 522/99; 522/908; 523/109; 523/120; 528/41; 525/479
[58] Field of Search ............ 522/99, 28, 68, 908; 523/109, 120; 528/41; 525/479

[56] References Cited

U.S. PATENT DOCUMENTS

| | | | |
|---|---|---|---|
| 3,785,054 | 1/1974 | Van Handel | 32/2 |
| 4,528,081 | 7/1985 | Lien et al. | 204/159.13 |
| 4,543,379 | 9/1985 | Gettleman et al. | 523/120 |
| 4,595,471 | 6/1986 | Preiner et al. | 522/29 |
| 4,648,843 | 3/1987 | Mitra | 433/201.1 |
| 4,678,846 | 7/1987 | Weitemeyer et al. | 525/477 |
| 4,746,686 | 5/1988 | Waller | 522/14 |
| 4,826,893 | 5/1989 | Yamazaki et al. | 523/115 |
| 4,952,711 | 8/1990 | Jacobine et al. | 522/99 |
| 4,988,743 | 1/1991 | Eckberg | 522/99 |
| 5,028,638 | 7/1991 | Heid et al. | 522/14 |
| 5,034,491 | 7/1991 | Wewers et al. | 528/41 |
| 5,037,473 | 8/1991 | Antonucci et al. | 106/35 |

OTHER PUBLICATIONS

Gettleman, Lawrence, Ralph J. LeBoeuf, Jr., and H. Ralph Rawls, "Soft and Firm PNF Denture Liners", Gulf South Research Institute, New Orleans, La., AADR Abstract, p. 250 (1983).

Gettleman, Lawrence, Janet M. Vargo, Paul H. Gebert, Charles L. Ferris, Ralph J. LeBoeuf, Jr., and H. Ralph Rawls, "Polyphosphazine Fluoroelastomer (PNF) as a Parmanent Soft Liner for Removable Dentures", Gulf Soutn Research Institute, pp. 55-61.

McCabe, John S., "Denture Lining Materials" Anderson's *Applied Dental Materials*, Chapter 14, Sixth Edition, pp. 92-98 (1985)

Wright, P. S., "Composition and Properties of Soft Lining Materials for Acrylic Dentures", Journal of Dentistry, 9, No. 3, pp. 210-223 (1981).

Wright, P. S., "Soft Lining Materials: Their Status and Prospects", Journal of Dentistry, vol. 4, No. 6, pp. 247-256 (1976).

Braden, M. and P. S. Wright, "Water Absorption and Water Solubility of Soft Lining Materials for Acrylic Dentures," J. Dent. Res. 62(6):764-768, Jun. 1983.

Wright, P. S., "Characterization of the Adhesion of Soft Lining Materials to Poly (methyl methacrylate)", J. Dent. Res. 61(8):1002-1005, Aug. 1982.

Parker, S., and M. Braden, "New Soft Lining Materials", Journal of Dentistry 10, No. 2, pp. 149-153, 1982.

Graham, B. S., D. W. Jones and E. J. Sutow, "Clinical Implications of Resilient Denture Lining Material Research, Part I: Flexibility and Elasticity", The Journal of Prsothetic Dentistry, vol. 62, No. 4, pp. 421-428 (1989).

*Primary Examiner*—Melvyn I. Marquis
*Assistant Examiner*—Karen A. Dean
*Attorney, Agent, or Firm*—Haugen and Nikolai

[57] ABSTRACT

Improved permanent soft denture liners are disclosed which consist substantially of an amount of one or more polysiloxanes selected from acryloxyalkyl and methacryloxyalkyl-terminated polydialkylsiloxanes in which the polysiloxane is crosslinked by a material selected from suitable heat, light or chemically activated initiators with or without crosslinking agents. The preferred embodiments are visible light activated and can be applied, fitted, cured and installed in one sitting.

17 Claims, No Drawings

ORGANOSILICON SOFT DENTURE LINERS

CROSS-REFERENCE TO RELATED APPLICATION

This is a continuation-in-part of application Ser. No. 07/608,212 filed Nov. 2, 1990, now abandoned.

BACKGROUND OF THE INVENTION

1. Field of the Invention

The subject invention is directed generally to materials for lining dentures and, more particularly, to improved permanent soft denture liners based on new organosilicon polymers and monomers. According to the present invention, proper selection of an organosilicon polymer and a siloxane monomer as its crosslinking agent, and by optimizing the liner formulation, lining materials can be produced which have enhanced resiliency, good bonding to the denture base, and minimum chemical degradation and water sorption.

2. Description of the Related Art

With respect to the invention, it is believed that some discussion of the background of denture liners would be helpful. In this manner, the invention can be put in better perspective.

Denture liners are utilized to interface between the interior surfaces of dentures and the denture-bearing mucosa, or gum tissue, of the patient. Relining is a process in which a relatively thin film of polymer is added to the inside surface of the denture to obtain an improved fit with the contours of the denture-bearing mucosa. The technique includes making an impression of the denture-bearing mucosa after applying the polymer to the denture. The denture liners are of several types and are used for a variety of reasons. They are generally classified into three groups:

(1) hard relining materials;
(2) tissue conditioners; and
(3) soft lining materials.

The hard relining materials are generally used for adjustments or a quick-fixes of ill-fitting dentures. They can be applied to accomplish on-the-spot refitting of dentures.

To date, two types of materials have been utilized to make hard relining materials. Each type of material typically consists of two parts, a powder and a liquid. In the first type (type 1), the powder is made of polymethylmethacrylate (PMMA) polymer beads mixed with benzoyl peroxide, a free radical polymerization initiator, and the liquid is a combination of monomer methyl methacrylate (MMA) mixed with a plasticizer, and a polymerization accelerator, e.g., a tertiary amine. In the second type (type 2), the powder is made of polyethylmethacrylate (PEMA) beads mixed with benzoyl peroxide, and the liquid is a mixture of butylmethacrylate monomer (BMA), and a polymerization accelerator such as a tertiary amine.

Examples of such hard denture relining materials are found in Antonucci et al (U.S. Pat. No. 5 037 473). Although curable by visible light, the monofunctional monomers disclosed polymerize but do not crosslink; and, unfortunately, those liners possess all of the drawbacks common to hard denture repair materials as enumerated below.

In use, the two parts (either type) are mixed and applied to the interior surface of the denture. The liner is hardened slowly by polymerization, and during the term of cure, while the material is still soft, the denture is inserted and an impression of the oral tissue is recorded. The denture is then removed and the remainder of the curing takes place with the denture removed.

These hard liners have certain undesirable drawbacks, however. The presence of the plasticizer generally gives the hard reline materials a rather low Tg (glass transition temperature) and this often leads to dimensional instability in the oral environment. The monomer MMA in type 1 liners is an irritant to many patients and so can produce tissue inflammation. In addition, since the cured liner is rather hard, and the thickness of the liner is difficult to control, hard reliners are usually used only as temporary solution to the ill-fitting denture. They do not provide the long-term solution desired by denture wearers.

Tissue conditioners are soft polymeric materials used to treat mucosa irritated by other denture lining materials. They are mixed at chairside, placed in the denture, and the denture is then seated in the patient's mouth. The materials will conform to the anatomy contours of the residual ridge, gel in that position, but not harden and continue to flow slowly after application.

Tissue conditioners typically consist of polymers of higher methacrylates, such as polyethylmethacrylate, a solvent, such as ethyl alcohol, and a plasticizer, e.g., butylphthalyl butylglycolate. The solvent and the plasticizer are mixed with the polymer immediately prior to use, and the mixture is then applied to the surface of the denture. The setting of the tissue conditioning liner involves the swelling of the polymer by the solvent and the diffusion of the plasticizer into the polymer matrix causing the polymer to become soft and resilient. Tissue conditioners are initially very soft after application, having a modulus of elasticity value of approximately 0.05 MPa after one hour compared with a value of 2000 MPa for typical acrylic denture base materials. The softness of the polymer liners, however, is temporary. Loss of solvent and leaching of the plasticizer from the polymer matrix occur continuously in the oral environment and producing hardening of the liners in 2-3 days.

On a short-term basis, however, these materials are able to perform both as tissue conditioners and functional impression materials due to the viscoelastic properties of the materials. The elastic nature of the materials cushions the cyclic forces of mastication; and the viscous properties of the materials allow excellent adaptation to the irritated denture-bearing mucosa.

As to the third category of denture liners, both temporary and permanent soft lining materials are currently being used. Temporary soft liners are chemically similar to tissue conditioners except that they are formulated to retain their softness for a longer period of time. They may also be used as tissue conditioners and as diagnostic aids to ascertain whether the patient would benefit from permanent soft liners.

The denture-bearing mucosa of patients vary, and some are more sensitive or thinner than others and cannot tolerate the masticatory force applied to the hard denture base. For these patients, a permanent soft liner is needed on the surface of the hard denture as the cushion.

The temporary soft liners mainly consist of polymers of higher methacrylates, e.g., polyethylmethacrylate, a solvent, e.g., ethyl alcohol, and a plasticizer, e.g. butylphthalyl butylglycolate. These and others are disclosed in Graham et al, *J. Prosthetic Dentistry*, Volume 2, No. 4, pp. 422-8 (1989). As with the tissue conditioners, the solvent and plasticizer are mixed with the polymer immediately prior to use, and the mixture is then applied to the surface of the denture. Swelling of the polymer by the solvent, and diffusion of the plasticizer into the polymer matrix cause the polymer to become soft and resilient. As with the tissue conditioners, loss of solvent and leaching of plasticizer occur continuously in the oral environment and eventually cause the hardening of the liners. A number of permanent soft denture liners are commercially available and some others are currently under development. The majority of commercial soft liners are based on silicone polymers, the so-called polysiloxanes of the general structure (I)

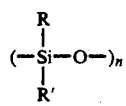
(I)

where n is an integer having a value of from 1 to about 10,000, and where R and R' are organic radicals such as methyl or phenyl groups or hydrogen atoms.

Two kind of polysiloxanes are commonly used for soft liners. They are vinyl-terminated polydimethylsiloxane (II), and hydroxyl-terminated polydimethylsiloxane (III),

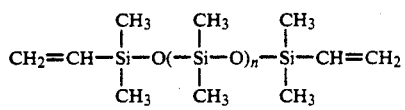
(II)

where n is an integer having a value from 1 to about 5,000.

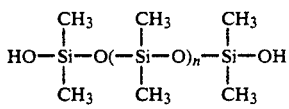
(III)

where n is an integer having a value from 1 to about 5,000.

For ease of application, silica fillers are usually added to the polysiloxanes so that the polymer-filler mixtures have the consistency of pastes. The filler particles also enhance the mechanical properties of the elastomers after cure.

The vinyl-terminated siloxane polymer mixes (II) are heat cured and contain an amount of benzoyl peroxide which acts as a free-radical polymerization and crosslinking initiator. Upon application of heat, the initiator promotes the crosslinking of the polymer molecules and thus converts the linear polymer into a highly resilient elastomer. The heat activated crosslinking reaction is in the nature of a pure addition reaction which does not produce any by-product. The liners are often referred to as heat curing silicone soft liners.

The curing of hydroxyl-terminated polydimethylsiloxanes, on the other hand, is in the nature of a condensation reaction. Although it requires no heat, the reaction requires a crosslinking agent, e.g., tetraethyl silicate, and a catalyst, such as dibutyl tin dilaurate. Upon the mixing of the polysiloxane with the crosslinking agent and the catalyst, the catalyst initiates the crosslinking of the polysiloxane molecules at room temperature and converts the linear polymer into a highly resilient elastomer. The condensation reaction produces ethyl alcohol as the by-product. The liners are often called cold curing silicone soft liners.

Desired characteristics for permanent soft liners include permanent resiliency, high dimensional stability, adequate adhesion to the denture base polymer, PMMA, adequate wettability in the oral environment, compatibility with oral tissue, i.e., non-toxic, non-irritant, and such materials should be incapable of sustaining bacterial growth.

Although a number of polysiloxane-based permanent soft liners are currently available, actual reports on their clinical performance have been meager. Based on the chemical structure of the materials, the nature of the crosslinking reactions which occur during cure, and available reports on the physical, chemical and mechanical properties of the liners; however, it appears clear that current polysiloxane-based soft liners have many drawbacks. None of the presently available materials comes close to fulfilling all the above requirements.

The heat cured type of soft liners, for example, are made from vinyl-terminated polydimethylsiloxane which is highly hydrophobic, and thus has a very low wettability. Additionally, the vinyl-terminated polydimethylsiloxane is chemically dissimilar to the more polar PMMA denture base polymer material, and consequently, its adhesion to the PMMA denture base is poor.

The cold cured hydroxyl-terminated polydimethylsiloxane soft liners rely on an organo tin compound as the catalyst to crosslink the polymers. The residual organo tin catalyst is often an irritant to the patients. In addition, the siloxane bonds formed by the condensation reactions are susceptible to hydrolysis. The cold cured polysiloxane soft liners have further been reported to have poor wettability, poor dimensional stability, and poor rupture resistance.

Organopolysiloxanes with diverse uses have been proposed. Examples include tapes and release paper adhesives using mixtures of certain methacrylate ester-modified organopolysiloxanes disclosed in Wewers et al (U.S. Pat. No. 5,034,491). In Weitemeyer et al (U.S. Pat. No. 4 678 846), such material is used as a metal adhesive, and by Lien et al (U.S. Pat. No. 4 528 081) for electronic potting applications. Nothing is disclosed in these references, however, with regard to possible usefulness or compatibility of these compounds in an oral environment. Likewise, Jacobine et al (U.S. Pat. No. 4,952,711) disclose yet additional polysiloxane or silicone materials having unsaturated terminal groups which may also be useful as adhesives or for potting. They disclose a bis(-(meth)acryloxy)propenyl terminated polydimethylsiloxane as one possible preferred unsaturated acrylic functional silicone prepolymer which, when mixed with a silicone prepolymer having a plurality of organothiol groups and a thiolene cure catalyst, is curable to a solid crosslinked polyorganosiloxane. The possible reactivity of these unsaturated terminal groups, however, is an additional unknown with respect to judging compatibility of the material in an oral environment.

Dental resin compositions for use as crown or bridge resins or filling resins in dentistry which are made of modified siloxane copolymers are disclosed by Yamazaki et al in U.S. Pat. No. 4,826,893. It is further known to cure certain silicone polymers with UV light as shown in Preiner et al (U.S. Pat. No. 4,595,471) and Eckberg (U.S. Pat. No. 4,988,743).

Soft denture liners based on materials other than polysiloxanes are also known. The hydrophilic polymer poly(hydroxyethyl methacrylate) which turns into a hydrogel upon exposure to water has been reported to be the main ingredient of a commercial soft liner called Hydron ™ (trademark of National Patent Development Corporation of New York, N.Y.). The material, upon exposure to water, absorbs significant amount of water (up to 20 weight %), and thus is soft, compliant, and resilient in the oral environment. Unfortunately, because of significant water solubility, the dimensional stability and mechanical properties such as rupture resistance of the material are poor.

Other polymeric materials have been used in the oral environment. These include poly(ethylenically unsaturated) carbamoyl isocyanurates used as restoratives, prostheses, and sealants as disclosed by Mitra in U.S. Pat. No. 4 648 843. Other known restorative materials include those described by Heid et al (U.S. Pat. No. 5 028 638). They disclose a dental composite filling material containing a polymerizable (meth)acrylic compound in which camphorquinone is employed as a photoactivator with p-diaklylaminobenzene sulphonamide. Other methacrylate materials which are polymerizable or crosslinkable by ultraviolet or visible light are disclosed in Waller (U.S. Pat. No. 4,746,686).

Experimental soft denture liner materials based on polyphosphazene fluoroelastomer (PNF) have been disclosed by Gettleman et al in U.S. Pat. No. 4 543 379. These are high polymers containing an inorganic backbone of alternating nitrogen and phosphorus atoms. Using ethylene glycol dimethacrylate as the crosslinking agent, $BaSO_4$ as a filler, and lauroyl peroxide as a thermal initiator, the firmness of the crosslinked PNF can be varied from soft to firm by varying the amount of filler and the crosslinking agent. The PNF-based liners have been reported to bond well to PMMA.

SUMMARY OF THE INVENTION

The present invention involves the development of high performance soft denture liners based on novel polysiloxane materials generally selected from acryloxy or methacryloxy-terminated polydimethylsiloxanes and/or acryloxyalkyl or methacryloxyalkyl-terminated polydialkylsiloxanes of the general structure (IV)

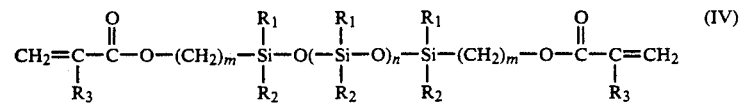

where:

m is an integer having a value from 0 to 5;

n is an integer having a value from 1 to about 5,000;

$R_1$ and $R_2$ are alkyl groups having from 1 to 5 carbon atoms, such as ethyl groups;

$R_3$ is H or $CH_3$; and wherein the polysiloxane is crosslinked by a material selected from suitable heat, light or chemically activated initiators with or without crosslinking agents.

The preferred degree of polymerization (n) will vary depending on the precise formula and the final hardness or other physical properties desired. While it is possible that materials in which n>5,000 might be usable, it is believed that they would not have required processability because of very high viscosity and the crosslinked product might not possess the resilient physical properties desired. The most preferred range of n will depend somewhat upon the selection of $R_1$, $R_2$ and $R_3$.

Of these, the most preferred polysiloxanes of the invention are methacryloxylpropyl-terminated polydimethylsiloxanes of the general structure (V)

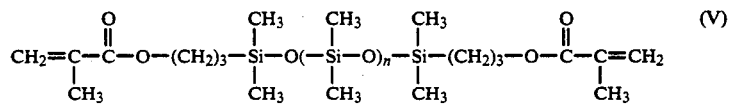

where n is an integer having a value from 1 to about 5,000.

As with the generic formula IV, above, it will be appreciated that the value of n can be varied according to the desired polymer viscosity.

The present invention contemplates high performance permanent soft denture liners based on the crosslinking of acryloxy or methacryloxyalkyl-terminated polydialkylsiloxanes. The linear polysiloxanes (IV) and (V) can be crosslinked by a suitable initiator with or without a crosslinking agent. The use of a crosslinking agent which itself is a siloxane monomer with dimethacrylate or diacrylate groups at the ends of the chain, such as 1,3-bis(3-methacryloxypropyl) tetramethyldisiloxane(MPTDS) (VI) or 1,3-bis[(p-acryloxymethyl) phenethyl] tetramethyldisiloxane (VII), offers more advantages.

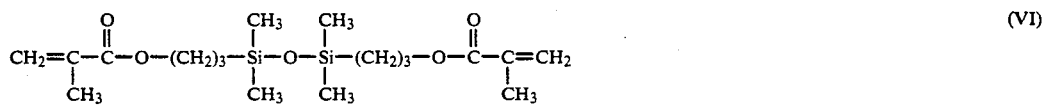

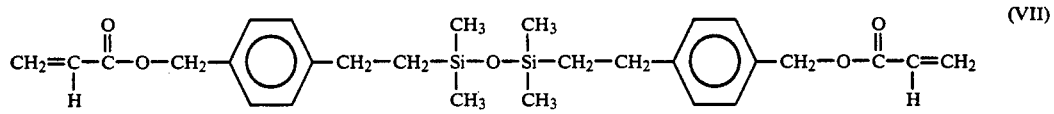

For example, since both polysiloxanes (IV) and (V) and the crosslinking agents (VI) and (VII) possess either methacrylate groups or acrylate groups which are chemically similar to PMMA, the adhesion of the new liners to denture base polymer PMMA would be expected to be excellent. They should also be compatible with oral tissues. Similarly, the wettability of the cured liners should be adequate and similar to that of PMMA. Further, the nature of the crosslinking reactions involving (IV) or (V) and (VI), or (IV) or (V) and (VII) are addition reactions by nature, and therefore, the crosslinked bonds, unlike those produced by the condensation reactions, should be more stable and resistant to degradation reactions such as hydrolysis. In addition, the crosslinking agents (VI) and (VII) are highly flexible siloxane monomers which potentially should further improve and modify the elasticity and resiliency of the liners.

Permanent soft denture liners based on polysiloxanes of the present invention having the structure (IV) and (V) offer many advantages. The polysiloxanes possess dimethacrylate or diacrylate groups which undergo free-radical polymerization and crosslinking upon application of heat, light or chemicals. The curing of the polysiloxanes (IV) and (V) can be accomplished by photo-crosslinking using a visible light photoinitiator, e.g., camphorquinone, and an accelerator, e.g., dimethylaminophenethanol, or by thermal crosslinking with the aid of benzoyl peroxide.

Of the possible curing methods available, photo-crosslinking is preferred because it is easy and rapid and offers the possibility of complete relining during one patient visit. The new liner can literally be fitted and cured at chairside. This eliminates the need for waiting several days before the fitting and curing is completed commonly associated with other processes.

DETAILED DESCRIPTION

As previously mentioned, certain characteristic property requirements must be met for permanent soft liners to be successful. These properties include permanent resiliency, high dimensional stability, adequate adhesion to the denture base material, adequate wettability in the oral environment and compatibility with oral tissues.

Resiliency is the ability of a material to spring back to its original shape after the removal of applied stress. Resiliency may be defined as the energy required to deform the material to the elastic limit, and is usually determined by measuring the area under a stress-strain curve up to the elastic limit E in a well-known manner. The elastic limit, of course, is the point beyond which strain is no longer directly proportional to stress, and beyond which strains are not fully recovered. A high performance soft denture liner must have high resiliency to enable it to absorb large amount of energy without being permanently deformed. High resiliency is an important characteristic of the elastomers of the invention.

High dimensional stability is also essential to the good fitting of the denture. Poor dimensional stability is often associated with significant swelling of the material, or the dissolution of the material, or the leaching of the additives such as plasticizer in the oral environment. In some cases, the degradation reactions such as hydrolysis will also help destroy dimensional stability.

Adequate adhesion to the denture base is essential. Adhesion has been defined as the state in which two surfaces are held together by interfacial forces of attraction, owing to the interactions of atoms and molecules. Adhesion may be chemical, or mechanical, or both. Chemical adhesion involves bonding at the I0 atomic or molecular level. Mechanical adhesion involves the retention by the interlocking or penetration of one phase into the surface of the other. In general, materials which are similar in chemical structures have better adhesion properties than materials which are dissimilar. It is clear that the liners should adhere well to the denture base for long usage. Most current denture materials are based on the polymer PMMA; therefore, the soft denture liners of the present invention should adhere well to that base polymer.

Adequate wettability in the oral environment is also desirable. Wetting is the process in which a liquid spontaneously adheres to and spreads on a solid surface. Adequate wetting of denture liners by water and saliva is necessary to the retention of the denture. Wettability is often characterized by measuring the contact angle, the angle between substrate plane and free surface of a liquid droplet at the line of the contact with the substrate. The greater the tendency for a liquid to wet the surface, the smaller the contact angle. For example, the contact angle of water on the denture base acrylic polymer PMMA is 74, while the contact angle of water on the non-wetting polytetrafluoroethylene is 110.

Denture liners are in direct contact with oral tissue and should be compatible with the tissue. They should be non-toxic, non-irritant, and incapable of sustaining bacterial growth.

Organosilicon polymers have been increasingly used in many areas of applications. Polysiloxanes are desirable because of their high degree of chemical inertness, low degree of toxicity, and high degree of thermal and oxidative stability. The chemical and physical properties of polysiloxanes are significantly dependent on the substituents R and R' in the polymers (I). Polysiloxanes can be either hydrophobic or hydrophilic depending on the nature of the substituents. For example, polydimethylsiloxane (and polydialkylsiloxanes in general) is a hydrophobic polymer which can be used as a water repellant. The uniqueness of polysiloxanes is that siloxane bonds Si—O—Si in the main chains, as well as Si—C bonds where side groups are bonded to silicon, are extremely flexible with a great freedom of motion. This is reflected in lower melting points, lower glass transition temperatures, lower viscosity, and lower surface tension, and is responsible for the elastomeric behaviors of many polysiloxanes.

In general, crosslinking of polysiloxanes can be achieved by several methods. One such method involves free radical crosslinking of linear polysiloxanes through the use of organic peroxides, e.g., benzoyl peroxide, at elevated temperature. The method is applicable to both polysiloxanes with unreactive end groups and polysiloxanes with reactive group, e.g., vinyl groups (called vinyl-terminated polysiloxanes). If vinyl groups are present, crosslinking can be achieved at lower temperature or with less active peroxide.

A second method involves cross-linking of linear polysiloxane or lightly branched polysiloxanes with reactive end groups such as silanols (hydroxyl-terminated polysiloxanes). The crosslinking requires a cross-linking agent, e.g., tetraethyl silicate, and a catalyst, e.g., dibutyl tin dilaurate, and is a condensation reaction by nature which may be characterized as follows:

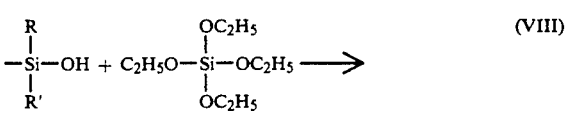

-continued

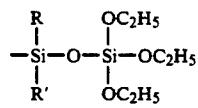

A third method involves cross-linking of polysiloxane by addition reactions. The reactions generally involve the addition of silyl hydride groups (—SiH) to vinyl groups (CH$_2$=CH—) attached to silicon with the aid of a platinum containing catalyst as shown in (IX).

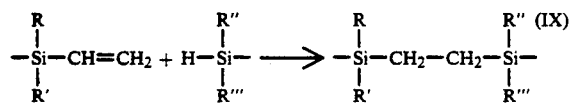

The importance of polysiloxane-based permanent soft denture liners of the invention are unique polysiloxane materials which possess more of the desired characteristics than any previous materials. The permanent soft denture liners of the invention, based on polysiloxanes (IV) or (V), offer many advantages. The polysiloxanes possess dimethacrylate or diacrylate groups which undergo free radical polymerization and crosslinking upon application of heat, light or chemicals.

The curing of the polysiloxanes (IV) and (V) can be accomplished by photo-crosslinking using a visible light photoinitiator, e.g. camphorquinone, and an accelerator, e.g., dimethylaminophenethanol, or by thermal crosslinking with aid of benzoyl peroxide. Photo-crosslinking offers the possibility of chairside replacement of permanent soft liners, not heretofore possible.

Specifically, the embodiments of the invention are directed to high performance permanent soft denture liners based on crosslinking of the acryloxyalkyl-terminated or methacryloxyalkyl-terminated polydialkylsiloxanes of (IV) (the most preferred of which are (V)) with the crosslinking agent dimethacrylate siloxane monomer (VI), or the crosslinking agent diacrylate siloxane monomer (VII). The curing of the liners can be conducted both by photo-crosslinking and thermal-crosslinking. The new liners should exhibit high and permanent resiliency, high dimensional stability, low in water sorption and water solubility, and have good adhesion to denture base polymer PMMA, good wettability and are compatible to oral tissues.

Although the linear polysiloxanes (IV) and (V) can be crosslinked by a suitable initiator with or without a crosslinking agent, use of a crosslinking agent which itself is siloxane monomer chain, such as 1,3-bis(3-methacryloxypropyl) tetramethyldisiloxane MPTDS (VI) or 1,3-bis[(p-acryloxymethyl) phenethyl] tetramethyldisiloxane (VII), would offer more advantage. Both polysiloxanes (IV) or (V) and the crosslinking agents (VI) and (VII) possess either methacrylate groups or acrylate groups which are chemically similar to that of PMMA, the wettability and adhesion of the new liners to denture base polymer PMMA would be expected to be excellent. The crosslinked bonds, unlike those produced by the condensation reactions, should be more stable and resistant to degradation reactions such as hydrolysis. In addition, the crosslinking agents (VI) and (VII) are themselves highly flexible siloxane monomers possessing flexible Si-O-Si bonds which are expected to further improve and modify the elasticity and resilience of the liners. With two phenyl groups in the monomer chain, the siloxane monomer (VII) would be expected to be stiffer than the monomer (VI). Thus, the firmness of the liners can be changed by choosing either monomer (VI) or (VII), or by varying the monomer concentration.

The siloxane polymer methacryloxypropyl-terminated polydimethylsiloxane (V) (viscosity=1500-2000 centistokes), and the two siloxane monomers, 1,3-bis(3-methacryloxypropyl) tetramethyldisiloxane (VI) and 1,3-bis[(p-acryloxymethyl) phenethyl] tetramethyldisiloxane (VII), are available from Hules America, Inc. of Bristol, Pa.

With respect to photo-curing of the permanent soft denture liners, a photoinitiator and an activator should be selected which initiate the crosslinking upon exposure to visible light. The photoinitiator and the activator must be miscible with the monomers. Camphorquinone and tertiary amines such as 2-dimethylamino ethyl methacrylate, 4-ethyl,N,N-dimethylaminobenzoate and dialkylamino phenethanols are candidates for the photoinitiator/activator systems. Crosslinking of the polysiloxane (IV) without the presence of the crosslinking agents is also believed to be feasible.

A filler, such as fume silica, can be added to the polysiloxane to enhance the mechanical properties and the ease of handling. The filler is preferably radiopaque, e.g., barium sulfate, or barium alumino borosilicate. The filler can be treated with an organosilane coupling agent to increase the bonding between the polymer and the filler. Possible coupling agents include vinyltriethoxysilane, hexamethyldisilazane or r-methacryloxypropyl trimethoxysilane, which are commercially available. The first two are more hydrophobic, while the third one is more polar. Coupling agents can be applied in organic solvents. It is contemplated that the composites contain approximately 10-30 weight % of the filler.

In accordance with the above criteria and in furtherance of demonstrating the soft denture liners of the invention, the following examples are offered. The examples verify the above discussion regarding properties of the liner.

EXAMPLE 1

11.0561 gm of compound (V)—methacryloxypropyl-terminated polydimethylsiloxane (weight average molecular weight, M$_W$=22,500) obtained from Huls America of Bristol, Pennsylvania, was mixed with 11.1 mg of benzoyl peroxide, and stirred until benzoyl peroxide was homogeneously dispersed in the polymer. A glass mold having a dimension of 2 mm×9 mm×75 mm was filled with the polymer mixture, and the mixture cured at 75° C. for 6 hours. The curing transformed the clear, viscous liquid polymer into a clear, soft and resilient elastomer. The percent elongation of the elastomer is more than 150% when stretched.

EXAMPLE 2

The methacryloxypropyl-terminated polydimethylsiloxane and benzoyl peroxide mixture was prepared according to Example 1. 10 weight % of fumed silica filler Aerosil OX50 (Degussa Corp.) was added to the polymer mixture and mixed homogeneously. The viscous polymer composite paste was introduced into the glass mold and cured at 75° C. for 6 hours. The cured specimen was a white, soft resilient elastomer having more than 150% elongation when stretched. The hardness of the cured specimen was higher than that of the cured specimen obtained in Example 1.

EXAMPLE 3

The methacryloxypropyl-terminated polydimethylsiloxane and benzoyl peroxide mixture was prepared according to Example 1. 20 weight % of fumed silica filler Aerosil OX50 (Degussa Corp.) was added to the polymer mixture and mixed homogeneously. The viscous polymer composite paste was filled into the glass mold and cured at 75° C. for 6 hours. The cured specimen was a white, soft resilient elastomer having more than 150% elongation when stretched. The hardness of the cured specimen was higher than the cured specimen obtained in Example 2. Dumbbell shaped specimens were fabricated and the tensile strength of the specimens was measured using Comten Tensile Tester according to the ASTM Designation: D412-87, Standard Test Method for Rubber Properties in Tension. The dimension of the neck in the specimen was 3 mm (thick)×25 mm (wide). The tensile strength of the specimen was found to be greater than 174 psi (1.2 MPa).

EXAMPLE 4

2.1411 g of methacryloxypropyl-terminated polydimethylsiloxane was mixed with of 1,3-bis(3-methacryloxypropyl) tetramethyldisiloxane (MPTDS) (obtained from Huls America of Bristol, Pa.), and 2.1 mg of benzoyl peroxide, and stirred until a homogeneous mixture was obtained. The glass mold was filled with the mixture, and the mixture cured at 75° C. for 6 hours. The thermal cure transformed the clear viscous polymer-monomer liquid into a clear, soft and resilient elastomer having more than 150% elongation when stretched. The specimen prepared in this example differed from the one prepared in Example 1 in that this specimen contained 5 weight % of the monomer MPTDS which acted as the crosslinking agent.

EXAMPLE 5

10 weight % of fumed silica filler Aerosil OX50 (Degussa Corp.) was added to the polymer-monomer-benzoyl peroxide mixture prepared according to Example 4, and mixed homogeneously to obtain polymer composite paste. The glass mold was filled with the viscous polymer paste and cured at 75° C. for 6 hours. The thermal cure transformed the composite paste into a white, soft and resilient elastomer having more than 150% elongation when stretched. The hardness of the specimen was higher than the elastomer obtained in Example 4.

EXAMPLE 6

1.2010 g of methacryloxypropyl-terminated polydimethylsiloxane was mixed with 12.1 mg of camphorquinone and 5.8 mg of 2-dimethylamino ethyl methacrylate, and stirred until a homogeneous mixture was obtained. 0.8925 g of the polymer mixture was then mixed homogeneously with 0.1780 g of fumed silica filler Aerosil OX50 (Degussa Corp.) to obtain a polymer composite paste. The polymer composite paste was used to fill a stainless steel mold with a dimension of 6 mm (diameter)×3 mm (height) having both sides covered with 1 mm thick glass plates. A visible light cure unit, Visilux 2 of 3M Co. of St. Paul, Minnesota, was used to expose the polymer composite specimen through the top glass plate. The exposure time was 3 minutes. The photocuring transformed the yellow polymer composite paste into a white, soft, rubbery and flexible elastomer.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different formulations and that various modifications both as to equipment and procedure details can be accomplished without departing from the scope of the invention itself.

What is claimed is:

1. A permanent soft denture liner consisting essentially of an amount of one or more polysiloxanes selected from methacryloxypropyl-terminated polydimethylsiloxanes having the approximate structural formula

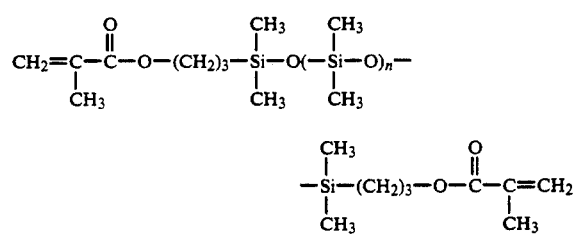

where n is an integer having a value from 1 to 5,000, and wherein the polysiloxane is crosslinked by a material selected from suitable heat, light or chemically activated initiators with or without crosslinking agents.

2. The permanent soft denture liner of claim 1 including an amount of a photoinitiator.

3. The permanent soft denture liner of claim 2 wherein the initiator includes a visible light photoinitiator and an amount of an accelerator.

4. The permanent soft denture liner of claim 3 including an amount of camphorquinone and 2-dimethylamino ethyl methacrylate.

5. The permanent soft denture liner of claim 1 including an amount of thermally activated initiator.

6. The permanent soft denture liner of claim 1 wherein the crosslinking material includes an amount of crosslinking agent in the form of a siloxane monomer having chain terminating groups selected from dimethacrylate or diacrylate groups.

7. The permanent soft denture liner of claim 6 wherein the crosslinking agent is selected from 1,3-bis(3-methacryloxypropyl) tetramethyldisiloxane (MPTDS) or 1,3-bis[(p-acryloxymethyl) phenethyl] tetramethyldisiloxane.

8. The permanent soft denture liner of claim 7 wherein the crosslinking agent is 1,3-bis(3-methacryloxypropyl)tetramethyldisloxane (MPTDS).

9. The permanent soft denture liner of claim 8 wherein the initiator is benzoyl peroxide.

10. permanent soft denture liner of claim further comprising an amount of inorganic filler material.

11. The permanent soft denture liner of claim 10 wherein the filler material is fumed silica.

12. A permanent soft denture liner consisting substantially of an amount of one or more polysiloxanes from methacryloxypropyl-terminated polydimethylsiloxanes having the approximate structural formula:

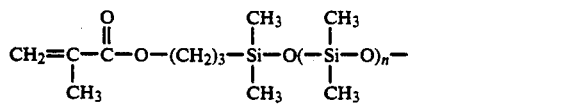

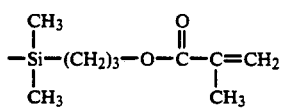

where n is an integer having a value from 1 to 5,000;
an amount of photoinitiator;
an amount of an accelerator;
an amount of crosslinking agent selected from 1,3-bis(3-methacryloxypropyl) tetramethyldisiloxane (MPTDS) or 1,3-bis[(p-acryloxymethyl) phenethyl] tetramethyldisiloxane, or combinations thereof; and
an amount of filler material.

13. The permanent soft denture liner of claim 12 wherein
the initiator is camphorquinone;
the accelerator is selected from dimethylaminophenethanol, 4-ethyl-N,N-dimethylaminobenzoate, 2-dimethylamino ethyl methacrylate or mixtures thereof; and
the filler is fumed silica.

14. A permanent soft denture liner consisting essentially of an amount of one or more polysiloxanes selected from acryloxyalkyl and methacryloxyalkyl-terminated polydialkylsiloxanes having the approximate structural formula

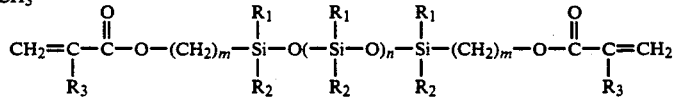

where:
m is an integer having a value from 0 to 5;
n is an integer having a value from 1 to 5,000;
$R_1$ and $R_2$ are alkyl groups having from 1 to 5 carbon atoms;
$R_3$ is H or $CH_3$; and
wherein the polysiloxane is crosslinked by a material selected from suitable heat, light or chemically activated initiators with or without crosslinking agents.

15. The permanent soft denture liner of claim 14 wherein $R_1$ and $R_2$ are methyl groups.

16. The permanent soft denture liner of claim 14 wherein $R_1$ and $R_2$ are ethyl groups.

17. The permanent soft denture liner of claim 14 wherein m is 3.

* * * * *

UNITED STATES PATENT AND TRADEMARK OFFICE
CERTIFICATE OF CORRECTION

PATENT NO. : 5,268,396
DATED : December 7, 1993
INVENTOR(S) : Juey H. Lai

It is certified that error appears in the above-indentified patent and that said Letters Patent is hereby corrected as shown below:

In column 12, line 61, after "claim", insert -- 1 -- .

Signed and Sealed this

Twenty-fourth Day of May, 1994

Attest:

BRUCE LEHMAN

*Attesting Officer*     *Commissioner of Patents and Trademarks*